United States Patent
Kuwajima et al.

(10) Patent No.: US 12,552,924 B2
(45) Date of Patent: Feb. 17, 2026

(54) FLUORORESIN, MULTILAYER PRODUCT, AND TUBE

(71) Applicant: DAIKIN INDUSTRIES, LTD., Osaka (JP)

(72) Inventors: Yuuki Kuwajima, Osaka (JP); Yukinori Kamiya, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 139 days.

(21) Appl. No.: 18/167,469

(22) Filed: Feb. 10, 2023

(65) Prior Publication Data

US 2023/0203296 A1 Jun. 29, 2023

Related U.S. Application Data

(63) Continuation of application No. PCT/JP2021/036297, filed on Sep. 30, 2021.

(30) Foreign Application Priority Data

Sep. 30, 2020 (JP) ................................. 2020-166480

(51) Int. Cl.
| | |
|---|---|
| *C08L 27/18* | (2006.01) |
| *B32B 1/08* | (2006.01) |
| *B32B 27/30* | (2006.01) |
| *B32B 27/32* | (2006.01) |
| *B32B 27/34* | (2006.01) |
| *C08F 214/26* | (2006.01) |
| *F16L 11/04* | (2006.01) |

(52) U.S. Cl.
CPC ............... *C08L 27/18* (2013.01); *B32B 1/08* (2013.01); *B32B 27/306* (2013.01); *B32B 27/322* (2013.01); *B32B 27/34* (2013.01); *C08F 214/262* (2013.01); *C08F 214/265* (2013.01); *B32B 2250/03* (2013.01); *B32B 2250/24* (2013.01); *B32B 2597/00* (2013.01); *C08F 2800/10* (2013.01); *F16L 11/04* (2013.01)

(58) Field of Classification Search
None
See application file for complete search history.

(56) References Cited

U.S. PATENT DOCUMENTS

| | | | |
|---|---|---|---|
| 2003/0148125 A1 | 8/2003 | Inaba et al. | |
| 2003/0157335 A1 | 8/2003 | Inaba et al. | |
| 2004/0060642 A1 | 4/2004 | Inaba et al. | |
| 2006/0124190 A1* | 6/2006 | Cheng | B32B 27/322 138/137 |
| 2008/0317986 A1* | 12/2008 | Schmitz | C08L 23/04 428/35.7 |
| 2009/0291243 A1 | 11/2009 | Kitahara et al. | |

FOREIGN PATENT DOCUMENTS

| | | |
|---|---|---|
| CN | 101171128 A | 4/2008 |
| EP | 1 897 686 A1 | 3/2008 |
| EP | 3 305 523 A1 | 4/2018 |
| JP | 2003-176394 A | 6/2003 |
| JP | 2007-015364 A | 1/2007 |
| JP | 2012-106341 A | 6/2012 |
| JP | 2018-058289 A | 4/2018 |
| KR | 2002-0086663 A | 11/2002 |
| WO | 01/58686 A1 | 8/2001 |
| WO | 01/60606 A1 | 8/2001 |
| WO | 01/70485 A1 | 9/2001 |

OTHER PUBLICATIONS

International Search Report for PCT/JP2021/036297 dated Dec. 14, 2021 [PCT/ISA/210].
International Preliminary Report on Patentability dated Mar. 28, 2023 with a Translation of the Written Opinion of the International Searching Authority in Application No. PCT/JP2021/036297.
Extended European Search Report issued Oct. 7, 2024 in Application No. 21875822.5.

* cited by examiner

*Primary Examiner* — Ramsey Zacharia
(74) *Attorney, Agent, or Firm* — Sughrue Mion, PLLC

(57) ABSTRACT

A fluororesin having a tensile strength retention ratio of 50% or more, the tensile strength retention ratio being calculated by the following formula from the tensile strength of the fluororesin after a heat treatment obtained by conducting a heat treatment at 130° C. for 40,000 hours, and the tensile strength of the fluororesin before the heat treatment. Tensile strength retention ratio (%)=(tensile strength of fluororesin after heat treatment (MPa))/(tensile strength of fluororesin before heat treatment (MPa))×100.

12 Claims, No Drawings

FLUORORESIN, MULTILAYER PRODUCT, AND TUBE

CROSS-REFERENCE TO RELATED APPLICATIONS

This application is a Rule 53(b) Continuation of International Application No. PCT/JP2021/036297 filed Sep. 30, 2021, which claims priority based on Japanese Patent Application No. 2020-166480 filed Sep. 30, 2020, the respective disclosures of which are incorporated herein by reference in their entirety.

TECHNICAL FIELD

The present disclosure relates to a fluororesin, a laminate and a tube.

BACKGROUND ART

Tubes famed of a fluororesin are known. Laminated tubes famed by laminating a fluororesin and other polymers are also known.

As a method for producing such a laminated tube, Patent Literature 1 proposes a method for producing a multilayer laminate in which at least a polyamide (A) and a fluorine-containing ethylenic polymer (B) are laminated by a simultaneous multilayer coextrusion method using a coextrusion apparatus composed of a die and a plurality of extruders that supply resins to the die to obtain a laminate constituted by the polyamide (A) and fluorine-containing ethylenic polymer (B), wherein the temperature of the die is set within a range of higher than 260° C. and 310° C. or less.

CITATION LIST

Patent Literature

Patent Literature 1: WO2001/070485

SUMMARY

The present disclosure provides a fluororesin having a tensile strength retention ratio of 50% or more, the tensile strength retention ratio being calculated by the following formula from the tensile strength of the fluororesin after a heat treatment obtained by conducting a heat treatment at 130° C. for 40,000 hours, and the tensile strength of the fluororesin before the heat treatment.

Tensile strength retention ratio (%)=(tensile strength of fluororesin after heat treatment (MPa))/(tensile strength of fluororesin before heat treatment (MPa))×100

EFFECTS

The present disclosure can provide a fluororesin from which a tube having a smooth inner surface can be produced even when a tube is produced by extruding at a high line speed.

DESCRIPTION OF EMBODIMENTS

Specific embodiments of the present disclosure will now be described in detail below, but the present disclosure is not limited to the following embodiments.

The fluororesin of the present disclosure is a fluororesin having a tensile strength retention ratio of 50% or more after conducting a heat treatment at 130° C. for 40,000 hours (hereinafter, may be referred to as "the first fluororesin").

The fluororesin of the present disclosure has an extraction of an extract to be extracted in perfluorocyclobutane of 0.3% by mass or less based on the mass of the fluororesin immersed (hereinafter, may be referred to as "the second fluororesin").

The production method described in Patent Literature 1 can provide a multilayer laminate of which layers are adhered by employing a relatively high die temperature. However, in the case of insufficient heat resistance of the fluororesin, for a reason such as exposure of the fluororesin to a relatively high die temperature, the inner surface of a tube to be obtained may become rough. Particularly in the case of extruding at a high line speed, the inner surface of a tube to be obtained may become rough.

An intensive study thus has been made on a means for solving the above problems, and it has been found that use of a fluororesin having a high tensile strength retention ratio as a material for extrusion forming enables a tube to be produced, the tube having a smooth inner surface even in the case of extruding at a high line speed. Further, a method for producing a fluororesin having a high tensile strength retention ratio also has been found. The first fluororesin of the present disclosure has been completed based on these findings.

Additionally, an intensive study thus has been made on a means for solving the above problems, and it has been found that use of a fluororesin having a small extraction of an extract to be extracted in perfluorocyclobutane as a material for extrusion forming enables a tube to be produced, the tube having a smooth inner surface even in the case of extruding at a high line speed. Further, a method for producing a fluororesin having a small extraction in perfluorocyclobutane also has been found. The second fluororesin of the present disclosure has been completed based on these findings.

The first fluororesin of the present disclosure has a tensile strength retention ratio of 50% or more after conducting a heat treatment at 130° C. for 40,000 hours. The tensile strength retention ratio is calculated by the following formula from the tensile strength of the fluororesin after a heat treatment obtained by conducting a heat treatment at 130° C. for 40,000 hours, and the tensile strength of the fluororesin before the heat treatment.

Tensile strength retention ratio (%)=(tensile strength of fluororesin after heat treatment (MPa))/(tensile strength of fluororesin before heat treatment (MPa))×100

The first fluororesin of the present disclosure may have a tensile strength retention ratio of 50% or more after the fluororesin subjected to a heat treatment at 135° C. for 40,000 hours, may have a tensile strength retention ratio of 50% or more after the fluororesin subjected to a heat treatment at 150° C. for 40,000 hours, may have a tensile strength retention ratio of 50% or more after the fluororesin subjected to a heat treatment at 170° C. for 40,000 hours, and may have a tensile strength retention ratio of 50% or more after the fluororesin subjected to a heat treatment at 200° C. for 40,000 hours. In other words, the temperature at which the tensile strength retention ratio of the first fluororesin of the present disclosure after the fluororesin is subjected to a heat treatment for 40,000 hours is 50% is preferably 130° C. or more, more preferably 135° C. or more, even more preferably 150° C. or more, particularly preferably 170° C. or more, and most preferably 200° C. or more.

The first fluororesin of the present disclosure has a high tensile strength retention ratio after subjected to a heat treatment and is excellent in heat resistance. Thus, decomposition during forming is suppressed, a tube having a smooth inner surface can be produced therefrom even in the case of extruding at a high line speed, and further, a molded article excellent in heat resistance also can be obtained. Automobile engines have been progressively downsized in recent years, and the temperature of engines and exhaust gas tends to increase. In association with this, parts to be installed inside automobiles are required to have higher heat resistance than that so far achieved. The first fluororesin of the present disclosure, which has a high tensile strength retention ratio after subjected to a heat treatment, is suitably available for a material forming parts to be installed inside automobiles, the parts reaching extremely high temperatures, such as a fuel tube.

The extraction of an extract to be extracted in perfluorocyclobutane of the second fluororesin of the present disclosure is 0.3% by mass or less based on the mass of the fluororesin immersed. The extraction of the extract is preferably 0.2% by mass or less, more preferably 0.1% by mass or less, even more preferably 0.05% by mass or less, and particularly preferably 0.03% by mass or less.

The extraction of the extract can be identified by immersing a fluororesin in perfluorocyclobutane at 60° C. for 10 days, taking the fluororesin out from the perfluorocyclobutane to recover the perfluorocyclobutane, heating the perfluorocyclobutane to remove the perfluorocyclobutane, measuring the mass of the extract remaining (dry mass of the residue), and calculating the proportion of the mass of the extract based on the mass of the fluororesin immersed.

The second fluororesin of the present disclosure has a small extraction of the extract to be extracted in perfluorocyclobutane. Thus, a tube having a smooth inner surface and not influenced from the extract can be produced therefrom even in the case of extruding at a high line speed, and further, a molded article excellent in heat resistance also can be obtained. Automobile engines have been progressively downsized in recent years, and the temperature of engines and exhaust gas tends to increase. In association with this, parts to be installed inside automobiles are required to have higher heat resistance than that so far achieved. The second fluororesin of the present disclosure has a small extraction of the extract to be extracted in perfluorocyclobutane and thus, is suitably available for a material forming parts to be installed inside automobiles, the parts reaching extremely high temperatures, such as a fuel tube.

The second fluororesin of the present disclosure preferably has a high tensile strength retention ratio similarly as the first fluororesin of the present disclosure. The second fluororesin of the present disclosure can have a tensile strength retention ratio comparable to that of the first fluororesin of the present disclosure.

Hereinafter, constituents common in the first fluororesin of the present disclosure and the second fluororesin of the present disclosure will be described. Hereinafter, the first fluororesin of the present disclosure and the second fluororesin of the present disclosure may be collectively and simply referred to as "the fluororesin of the present disclosure".

The fluororesin of the present disclosure preferably has a reactive functional group. The fluororesin of the present disclosure, if having a reactive functional group, exhibits high adhesion to other materials. Accordingly, use of a fluororesin having a reactive functional group enables laminates and multilayer tubes having an excellent interlayer adhesive strength to be produced with high productivity. The fluororesin more preferably has a reactive functional group at a main-chain end and/or in a side chain of the polymer. The reactive functional group is preferably at least one selected from the group consisting of a carbonyl group, a hydroxyl group, a heterocyclic group, and an amino group.

In the present disclosure, the "carbonyl group" is a divalent carbon group including a carbon-oxygen double bond, and is typified by —C(=O)—. The reactive functional group containing the carbonyl group is not limited, and examples include those containing a carbonyl group as a part of the Chemical structure, such as a carbonate group, a carboxylic acid halide group (a halogenoformyl group), a formyl group, a carboxyl group, an ester bond (—C(=O) O—), an acid anhydride bond (—C(=O)O—C(=O)—), an isocyanate group, an amide group, an imide group (—C (=O)—NH—C(=O)—), a urethane bond (—NH—C(=O) O—), a carbamoyl group ($NH_2$—C(=O)—), a carbamoyloxy group ($NH_2$—C(=O)O—), a ureido group ($NH_2$—C (=O)—NH—), and an oxamoyl group ($NH_2$—C(=O)—C (=O)—).

In the amide group, the imide group, the urethane bond, the carbamoyl group, the carbamoyloxy group, the ureido group, the oxamoyl group, and the like, a hydrogen atom bonded to the nitrogen atom thereof may be replaced with a hydrocarbon group such as an alkyl group.

In terms of the ease of introduction and in terms of suitable heat resistance and good adhesion at a relatively low temperature of the fluororesin, the reactive functional group is preferably an amide group, a carbamoyl group, a hydroxyl group, a carboxyl group, a carbonate group, a carboxylic acid halide group, and an acid anhydride bond, and more preferably an amide group, a carbamoyl group, a hydroxyl group, a carbonate group, a carboxylic acid halide group, and an acid anhydride bond.

The reactive functional group, in particular, is preferably at least one selected from the group consisting of a carbonate group and a carboxylic halide group. The carbonate group and carboxylic halide group may be groups described in International Publication No. WO 99/45044.

The fluororesin may be a polymer having a reactive functional group either at a main-chain end or in a side chain of the polymer, or may be a polymer having a reactive functional group both at a main-chain end and in a side chain. When the polymer has a reactive functional group at a main-chain end, the polymer may have a reactive functional group at both ends of the main chain, or may have a reactive functional group only at one end. When the reactive functional group also has an ether bond, the polymer may further have the reactive functional group in the main chain.

The fluororesin is preferably a polymer having a reactive functional group at a main-chain end because it does not impair mechanical properties and chemical resistance remarkably or because it is advantageous in terms of productivity and cost.

The number of the above reactive functional groups is suitably selected according to the difference in the kind of an adjacent layer, shape, purpose of adhering, application, required adhesion, and an adhering method with an adjacent layer.

The number of reactive functional groups is preferably 3 to 800, more preferably 15 or more, even more preferably 30 or more, particularly preferably 50 or more, preferably 500 or less, and more preferably 300 or less per $10^6$ main-chain carbon atoms, in respect that further higher adhesion can be obtained. When the fluororesin of the present disclosure has at least one selected from the group consisting of a carbonate group and a carboxylic halide group, the total number of carbonate groups and carboxylic halide groups is preferably 3 to 800, more preferably 15 or more, even more preferably 30 or more, particularly preferably 50 or more, preferably 500 or less, and more preferably 300 or less per $10^6$ main-chain carbon atoms.

The number of reactive functional groups can be determined in the following manner: a film sheet having a thickness of 50 to 200 μm obtained by compression-molding a fluororesin at a molding temperature 50° C. higher than the melting point thereof under a molding pressure of 5 MPa is analyzed for an infrared absorption spectrum using an infrared spectrophotometer; the obtained infrared absorption spectrum is compared with the infrared absorption spectrum of a known film to determine the type of characteristic absorption of the reactive functional group; and the number is calculated from spectral differences according to the following formula.

Number of reactive functional groups (per $10^6$ main-chain carbon atoms)=$(1 \times K)/t$ l: Absorbance
K: Correction factor
t: Film thickness (mm)

Table 1 shows the correction factors for the reactive functional groups of interest.

[Table 1]

TABLE 1

| End group | Absorption frequency (cm$^{-1}$) | Correction factor |
|---|---|---|
| —OC(=O)O—R | 1817 | 1426 |
| —COF | 1884 | 405 |
| —COOH | 1813, (1795-1792), 1775 | 455 |
| —COOCH$_3$ | 1795 | 355 |
| —CONH$_2$ | 3438 | 408 |
| —CH$_2$OH | 3648 | 2325 |

The correction factors in Table 1 are values that have been determined from the infrared absorption spectra of model compounds in order to calculate the number of reactive functional groups per $10^6$ main-chain carbon atoms.

The carboxylic halide group may decompose into a carboxylic acid due to heating or the like during formation of the fluororesin or over time. Thus, it should be considered that the fluororesin generally contains, in addition to a carbonate and/or carboxylic halide group, a carboxylic acid group derived therefrom.

Examples of methods for introducing the reactive functional group into the main-chain and/or side-chain end include a method involving copolymerizing a monomer (β) containing the reactive functional group to introduce the reactive functional group, a method involving using a compound having or producing the reactive functional group as a polymerization initiator, a method involving using a compound having or producing the reactive functional group as a chain transfer agent, and a method involving introducing the reactive functional group into a fluoropolymer by way of a polymer reaction, and a method involving these methods in combination.

The monomer (β) containing the reactive functional group for introducing the reactive functional group by copolymerization is not limited as long as it is a monomer that is copolymerizable with a monomer yielding a fluororesin and that has the reactive functional group. Specific examples are as follows:

First examples of the monomer (β) include aliphatic unsaturated carboxylic acids described in International Publication No. WO 2005/100420. The unsaturated carboxylic acids preferably have at least one polymerizable carbon-carbon unsaturated bond within one molecule and at least one carbonyloxy group (—C(=O)—O—) within one molecule.

The aliphatic unsaturated carboxylic acid may be an aliphatic unsaturated monocarboxylic acid, or may be an aliphatic unsaturated polycarboxylic acid having two or more carboxyl groups. Examples of the aliphatic unsaturated monocarboxylic acid include unsaturated aliphatic monocarboxylic acids having 3 to 6 carbon atoms, such as (meth)acrylic acid and crotonic acid.

Examples of the aliphatic unsaturated polycarboxylic acid include unsaturated aliphatic polycarboxylic acids having 3 to 6 carbon atoms, such as maleic acid, fumaric acid, itaconic acid, citraconic acid, mesaconic acid, aconitic acid, maleic anhydride, itaconic anhydride, and citraconic anhydride.

Second examples of the monomer (β) include unsaturated compounds represented by the formula:

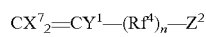

wherein $Z^2$ is the above reactive functional group; $X^7$ and $Y^4$ are the same or different and are a hydrogen atom or a fluorine atom; $Rf^4$ is an alkylene group having 1 to 40 carbon atoms, a fluorine-containing oxyalkylene group having 1 to 40 carbon atoms, a fluorine-containing alkylene group having an ether bond and having 2 to 40 carbon atoms, or a fluorine-containing oxyalkylene group having an ether bond and having 2 to 40 carbon atoms; and n is 0 or 1.

The content of the unit introduced by copolymerization from the monomer (β) containing the reactive functional group is preferably 0.05 mol % or more, and more preferably 0.1 mol % or more. When the content is excessive, gelation and a vulcanization reaction likely occur during thermal melting, and thus the upper limit of the content of the monomer (β) unit is preferably 5 mol %, and more preferably 3 mol %.

Various methods can be employed in order to obtain a fluororesin having a carboxylic halide group. For example, such a fluororesin can be obtained by pyrolyzing (decarbonizing) the fluororesin having a carbonate group mentioned above by heating. The heating temperature depends on the kind of carbonate group and the kind of fluororesin, but heating is made such that the temperature of the polymer itself reaches 270° C. or more, preferably 280° C. or more, and particularly preferably 300° C. or more. The upper limit of the heating temperature is preferably made to be equal to or less than the pyrolysis temperature of the portion of the fluororesin other than the carbonate group.

The fluororesin may have a heterocyclic group or an amino group at the main-chain end or the side-chain end of the polymer.

The heterocyclic group has a hetero atom (such as a nitrogen atom, a sulfur atom, or an oxygen atom) within the ring of its hetero ring moiety, may be a saturated ring or an unsaturated ring, and may be a single ring or a condensed ring. The heterocyclic group is preferably an oxazolyl group.

The amino group is a monovalent functional group obtained by removing hydrogen from ammonia or a primary or secondary amine. Specifically, the amino group is a group represented by, for example, the formula:

—NR¹R² wherein $R^1$ and $R^2$ may be the same or different, and are a hydrogen atom or a monovalent organic group having 1 to 20 carbon atoms. Specific examples of the amino group include —NH$_2$, —NH(CH$_3$), —N(CH$_3$)$_2$, —NH(CH$_2$CH$_3$), —N(C$_2$H$_5$)$_2$, and —NH(C$_6$H$_5$).

The fluororesin of the present disclosure has a relatively high initial pyrolysis temperature. The initial pyrolysis temperature of the fluororesin is preferably 330° C. or more, more preferably 350° C. or more, even more preferably 365° C. or more, particularly preferably 370° C. or more, most preferably 400° C. or more, and may be 500° C. or less. The initial pyrolysis temperature is a temperature when the mass reduction of the fluororesin reaches 1% by mass by heating the fluororesin at 10° C./min under an air atmosphere using a thermogravimeter-differential thermal analyzer.

The melting point of the fluororesin is preferably 160° C. or more, more preferably 190° C. or more, even more preferably 230° C. or more, particularly preferably 240° C. or more, preferably less than 324° C., more preferably 320° C. or less, even more preferably 300° C. or less, particularly preferably 280° C. or less, and most preferably 260° C. or less.

The melt flow rate (MFR) of the fluororesin at an arbitrary temperature (for example, 265° C. or 297° C.) within the range of about 230 to 350° C., which is the molding temperature range of fluororesins in general, is preferably 0.5 g/10 min or more, more preferably 2.0 g/10 min or more, even more preferably 5.0 g/10 min or more, particularly preferably 10 g/10 min or more, most preferably 15 g/10 min or more, preferably 100 g/10 min or less, more preferably 50 g/10 min or less, even more preferably 40 g/10 min or less, and particularly preferably 35 g/10 min or less. The melt flow rate can be identified by measuring the mass (g) of the fluororesin flowing out from a nozzle having an inner diameter of 2 mm and a length of 8 mm per unit time (10 minutes) at an arbitrary temperature (for example, 265° C. or 297° C.) under an arbitrary load (for example, 2.16 kg or 5 kg) using a melt indexer, for example.

The fluororesin of the present disclosure is a partially crystalline fluoropolymer, and is not a fluoroelastomer but a fluoroplastic. The fluororesin has a melting point and has thermoplasticity. The fluororesin may be melt-fabricable or may be non melt-processible. In respect that a tube can be produced by melt extrusion forming with high productivity, the fluororesin is preferably a melt-fabricable fluororesin.

In the present disclosure, melt-fabricability means that the polymer can be melted and processed using a conventional processing device such as an extruder and an injection molding machine. Accordingly, the melt-fabricable fluororesin usually has a melt flow rate of 0.01 to 500 g/10 min.

Examples of the melt-fabricable fluororesin include a tetrafluoroethylene (TFE)/perfluoro(alkyl vinyl ether) (PAVE) copolymer, a tetrafluoroethylene (TFE)/hexafluoropropylene (HFP) copolymer, a TFE/ethylene copolymer [ETFE], a TFE,/ethylene/HFP copolymer, a chlorotrifluoroethylene (CTFE)/ethylene copolymer [ECTFE], polyvinylidene fluoride [PVdF], polychlorotrifluoroethylene [PCTFE], a CTFE/TFE, copolymer, a TFE/vinylidene fluoride (VdF) copolymer [VT], polyvinyl fluoride [PVF], a TFE/VdF/CTFE, copolymer [VTC], and a TFE/HFP/VdF copolymer.

Examples of PAVE include perfluoro(methyl vinyl ether) (PMVE), perfluoro(ethyl vinyl ether) (PEVE), and perfluoro(propyl vinyl ether) (PPVE). Of these, PPVE is preferred. One or two or more of these can be used.

The fluororesin may have a polymerization unit based on other monomers in such a range of amount that essential characteristics of each fluororesin are not impaired. The other monomers can be suitably selected from, for example, TFE, HFP, ethylene, propylene, perfluoro(alkyl vinyl ether), perfluoroalkyl ethylene, hydrofluoroolefin, fluoroalkyl ethylene, perfluoro(alkyl aryl ether), and the like.

The fluororesin is preferably at least one selected from the group consisting of a TFE/perfluoro(alkyl vinyl ether) (PAVE) copolymer, a tetrafluoroethylene (TFE)/hexafluoropropylene (HFP) copolymer, a TFE/ethylene copolymer [ETFE], a TFE/ethylene/HFP copolymer, a chlorotrifluoroethylene (CTFE)/ethylene copolymer [ECTFE], polychlorotrifluoroethylene [PCTFE], and a CTFE/TFE copolymer, more preferably at least one selected from the group consisting of a TFE/ethylene copolymer [ETFE], a TFE/ethylene/HFP copolymer, a chlorotrifluoroethylene (CTFE)/ethylene copolymer [ECTFE], polychlorotrifluoroethylene [PCTFE], and a CTFE/TFE copolymer, and even more preferably at least one selected from the group consisting of a TFE/ethylene copolymer [ETFE], a TFE/ethylene/HFP copolymer, and a CTFE/TFE copolymer.

In the present disclosure, the content of each monomer unit of the fluororesin can be calculated by suitably combining NMR, E1-IR, an elemental analysis, and an X-ray fluorescence analysis according to the kind of monomer.

The mass ratio of TFE/HFP in a TFE/HFP copolymer is preferably 80 to 97/3 to 20 and more preferably 84 to 92/8 to 16.

The TFE/HFP copolymer may be a binary copolymer composed of TFE and HFP, and may further be a ternary copolymer composed of TFE, HFP, and a monomer copolymerizable therewith (for example, a TFE/HFP/PAVE copolymer).

The TFE/HFP copolymer is also preferably a TFE/HFP/PAVE copolymer containing a polymerization unit based on PAVE.

The mass ratio of TFE/HFP/PAVE in the TFE/HFP/PAVE copolymer is preferably 70 to 97/3 to 20/0.1 to 10 and more preferably 81 to 92/5 to 16/0.3 to 5.

The mass ratio of TFE/PAVE in a TFE/PAVE copolymer is preferably 90 to 99/1 to 10 and more preferably 92 to 97/3 to 8.

ETFE is a copolymer containing ethylene unit and TFE unit. Introduction of ethylene unit and TFE unit to a copolymer enables a tube having a smoother inner surface to be obtained and also facilitates production of a laminate by laminating with other materials. ETFE is preferably a copolymer having a molar ratio of TFE unit to ethylene unit (TFE unit/ethylene unit) of 20/80 or more and 90/10 or less. A more preferable molar ratio is 37/63 or more and 85/15 or less, and an even more preferable molar ratio is 38/62 or more and 80/20 or less. The ETFE may be a copolymer composed of TFE, ethylene, and a monomer copolymerizable with TFE and ethylene. Examples of the copolymerizable monomer include monomers represented by the following formulas: $CH_2=CX^5Rf^3$, $CF_2=CFRf^3$, $CF_2=CFORf^3$, and $CH_2=C(Rf^3)_2$, wherein $X^5$ represents H or F, and $Rf^3$ represents a fluoroalkyl group that may contain an ether bond. Of these, preferable is at least one selected from the group consisting of fluorine-containing vinyl monomers represented by $CF_2=CFRf^3$, $CF_2=CFORf^3$, and $CH_2=CX^5Rf^3$, more preferable is at least one selected from the group consisting of HFP, perfluoro(alkyl vinyl ethers) represented by $CF_2=CF-ORf^4$, wherein $Rf^4$ represents a perfluoroalkyl group having 1 to 5 carbon atoms, and fluorine-containing vinyl monomers represented by $CH_2=CX^5Rf^3$, wherein $Rf^3$ represents a perfluoroalkyl group having 1 to 8 carbon atoms, and even more preferable is HFP. The monomer copolymerizable with TFE and ethylene may be an aliphatic unsaturated carboxylic acid such as itaconic acid and itaconic anhydride. The content of the monomer unit copolymerizable with TFE and ethylene in ETFE is preferably 0.1 to 10 mol %, more preferably 0.1 to 5 mol %, and particularly preferably 0.2 to 4 mol %.

The TFE/ethylene copolymer is also preferably a TFE/ethylene/HFP copolymer containing a polymerization unit based on HFP (HFP unit). The mass ratio of TFE,/ethylene/HFP in the TFE,/ethylene/HFP copolymer is preferably 40 to 65/30 to 60/0.5 to 20 and more preferably 40 to 65/30 to 60/0.5 to 10.

The melting point of ETFE, is preferably 160° C. or more, more preferably 170° C. or more, even more preferably 180° C. or more, particularly preferably 190° C. or more, preferably less than 324° C., more preferably 320° C. or less, even more preferably 300° C. or less, particularly preferably 280° C. or less, and most preferably 260° C. or less.

The MFR (297° C.) of ETFE, is preferably 0.5 g/10 min or more, more preferably 2.0 g/10 min or more, even more preferably 5.0 g/10 min or more, particularly preferably 8 g/10 min or more, most preferably 10 g/10 min or more, preferably 100 g/10 min or less, more preferably 50 g/10 min or less, even more preferably 40 g/10 min or less, and particularly preferably 30 g/10 min or less. The MFR of ETFE, is measured at a temperature of 297° C. under a load of 5 kg.

As ETFE, the ethylene/tetrafluoroethylene copolymer described in Japanese Patent Laid-Open No. 2019-90013 is also suitably used.

The ethylene/CTFE, copolymer (ECTFE) is a copolymer containing ethylene unit and CTFE, unit. Preferably, the ethylene unit is 46 to 52 mol %, and the CTFE, unit is 54 to 48 mol %, based on the total of the ethylene unit and the CTFE, unit. ECTFE, may be a binary copolymer composed solely of ethylene unit and CTFE, unit and may further contain a polymerization unit based on a monomer copolymerizable with ethylene and CTFE, (for example, a fluoroalkyl vinyl ether (PAVE) derivative).

The content of a polymerization unit based on a monomer copolymerizable with ethylene and CTFE, is preferably 0.01 to 5 mol % based on the total of the ethylene unit, the CTFE, unit, and the polymerization unit based on the copolymerizable monomer.

The MFR of ECTFE (230° C.) is preferably 0.5 to 100 g/10 min. The MFR of ECTFE is measured at a temperature of 230° C. under a load of 2.16 kg.

The CTFE/TFE copolymer contains CTFE unit and TFE unit. Introduction of CTFE unit and TFE unit to a copolymer can make the tensile strength retention ratio after the fluororesin is subjected to a heat treatment higher and can further reduce the extraction of the extract to be extracted in perfluorocyclobutane. The CTFE/TFE copolymer is particularly preferably a copolymer containing CTFE unit, TFE unit, and a monomer ($\alpha$) unit derived from a monomer ($\alpha$) copolymerizable therewith.

The monomer ($\alpha$) is not limited as long as it is a monomer copolymerizable with CTFE and TFE, and examples include ethylene (Et), VdF, perfluoro(alkyl vinyl ether) [PAVE] represented by $CF_2=CF-ORf^1$ (wherein $Rf^1$ is a perfluoroalkyl group having 1 to 8 carbon atoms), a vinyl monomer represented by $CX^3X^4=CX^5(CF_2)_nX^6$ (wherein $X^3$, $X^4$, and $X^5$ are the same or different and a hydrogen atom or a fluorine atom; $X^6$ is a hydrogen atom, a fluorine atom, or a chlorine atom; n is an integer of 1 to 10), and an alkyl perfluorovinyl ether derivative represented by $CF_2=CF-OCH_2-Rf^2$ (wherein $Rf^2$ is a perfluoroalkyl group having 1 to 5 carbon atoms). In particular, at least one selected from the group consisting of PAVE, the vinyl monomer, and the alkyl perfluorovinyl ether derivative is preferable, and at least one selected from the group consisting of PAVE and HFP is more preferable.

PAVE is preferably perfluoro(alkyl vinyl ether) represented by $CF_2=CF-ORf^3$ (wherein $Rf^3$ represents a perfluoroalkyl group having 1 to 5 carbon atoms), such as perfluoro(methyl vinyl ether) [PMVE], perfluoro(ethyl vinyl ether) [PEVE], perfluoro(propyl vinyl ether) [PPVE], and perfluoro (butyl vinyl ether), more preferably at least one selected from the group consisting of PMVE, PEVE, and PPVE, and even more preferably PPVE.

In the alkyl perfluorovinyl ether derivative, $Rf^2$ is preferably a perfluoroalkyl group having 1 to 3 carbon atoms, and more preferably $CF_2=CF-OCH_2-CF_2CF_3$.

As for the ratio of the CTFE unit to the TFE unit in the CTFE/TFE copolymer, preferably, the CTFE unit is 15 to 90 mol %, and the TFE unit is 85 to 10 mol %. More preferably, the CTFE unit is 15 to 50 mol %, and the TFE unit is 85 to 50 mol %. Even more preferably, the CTFE unit is 15 to 25 mol %, and the TFE unit is 85 to 75 mol %.

The CTFE/TFE copolymer preferably has 90 to 99.9 mol % of the CTFE unit and the TFE unit in total and 0.1 to 10 mol % of the monomer ($\alpha$) unit. When the monomer ($\alpha$) unit is less than 0.1 mol %, moldability, environmental stress crack resistance, and fuel crack resistance are likely poor, and when exceeding 10 mol %, fuel barrier properties, heat resistance, and mechanical properties tend to be poor.

The CTFE/TFE copolymer is particularly preferably a CTFE/TFE/PAVE copolymer.

Examples of PAVE in the CTFE/TFE/PAVE copolymer include perfluoro(methyl vinyl ether) [PMVE], perfluoro (ethyl vinyl ether) [PEVE], perfluoro(propyl vinyl ether) [PPVE], and perfluoro(butyl vinyl ether). In particular, at least one selected from the group consisting of PMVE, PEVE, and PPVE is preferable, and PPVE is more preferable. In the CTFE/TFE/PAVE copolymer, the PAVE unit is preferably 0.5 mol % or more and preferably 5 mol % or less, based on all monomer units.

The melting point of the CTFE/TFE copolymer is preferably 190° C. or more, more preferably 210° C. or more, even more preferably 220° C. or more, particularly preferably 230° C. or more, most preferably 240° C. or more, preferably less than 324° C., more preferably 320° C. or less, even more preferably 270° C. or less, and most preferably 260° C. or less.

The MFR (297° C.) of the CTFE/TFE copolymer is preferably 0.5 g/10 min or more, more preferably 2.0 g/10 min or more, even more preferably 5.0 g/10 min or more, particularly preferably 7 g/10 min or more, most preferably 10 g/10 min or more, preferably 100 g/10 min or less, more preferably 50 g/10 min or less, even more preferably 40 g/10 min or less, and particularly preferably 35 g/10 min or less. The MFR of the CTFE/TFE copolymer is measured at a temperature of 297° C. under a load of 5 kg.

The fluororesin can be produced by polymerizing a fluorine-containing monomer that is to constitute the fluororesin by a polymerization method such as suspension polymerization, solution polymerization, emulsion polymerization, or bulk polymerization. The polymerization method is preferably emulsion polymerization or suspension polymerization and more preferably suspension polymerization. In the polymerization, conditions such as temperature and pressure as well as a polymerization initiator and other additives can be suitably set according to the composition and amount of the fluororesin.

The polymerization initiator to be used can be an oil-soluble radical polymerization initiator or a water-soluble radical polymerization initiator, and an oil-soluble radical polymerization initiator is preferable.

The oil-soluble radical polymerization initiator may be a known oil-soluble peroxide, and representative examples thereof include:

dialkyl peroxycarbonates such as di-n-propyl peroxydicarbonate, diisopropyl peroxydicarbonate, di-sec-butyl peroxydicarbonate, and di-2-ethoxyethyl peroxydicarbonate;

peroxyesters such as t-butyl peroxyisobutyrate and t-butyl peroxypivalate;

dialkyl peroxides such as di-t-butyl peroxide; and di[fluoro (or fluorochloro)acyl] peroxides.

Examples of the di[fluoro (or fluorochloro)acyl] peroxides include diacyl peroxides represented by [(RfCOO)—]$_2$, wherein Rf is a perfluoroalkyl group, an ω-hydroperfluoroalkyl group, or a fluorochloroalkyl group.

Examples of the di[fluoro (or fluorochloro)acyl] peroxides include di(ω-hydro-dodecafluorohexanoyl) peroxide, di(ω-hydro-tetradecafluoroheptanoyl) peroxide, di(ω-hydro-hexadecafluorononanoyl) peroxide, di(perfluoropropionyl) peroxide, di(perfluorobutyryl) peroxide, di(perfluorovaleryl) peroxide, di(perfluorohexanoyl) peroxide, di(perfluoroheptanoyl) peroxide, di(perfluorooctanoyl) peroxide, di(perfluorononanoyl) peroxide, di(ω-chloro-hexafluorobutyryl) peroxide, di(ω-chloro-decafluorohexanoyl) peroxide, di(ω-chloro-tetradecafluorooctanoyl) peroxide, ω-hydro-dodecafluoroheptanoyl-ω-hydrohexadecafluorononanoyl-peroxide, ω-chloro-hexafluorobutyryl-ω-chloro-decafluorohexanoyl-peroxide, ω-hydrododecafluoroheptanoyl-perfluorobutyryl-peroxide, di(dichloropentafluorobutanoyl) peroxide, di(trichlorooctafluorohexanoyl) peroxide, di(tetrachloroundecafluorooctanoyl) peroxide, di(pentachlorotetradecafluorodecanoyl) peroxide, and di(undecachlorotriacontafluorodocosanoyl) peroxide.

The water-soluble radical polymerization initiator may be a known water-soluble peroxide, and examples thereof include ammonium salts, potassium salts, and sodium salts of persulfuric acid, perboric acid, perchloric acid, peiphosphoric acid, and percarbonic acid, organic peroxides such as disuccinic acid peroxide and diglutaric acid peroxide, t-butyl permalate, and t-butyl hydroperoxide. A reducing agent such as a sulfite may be used in combination with the peroxide, and the amount thereof to be used may be 0.1 to 20 times the amount of the peroxide.

In polymerization, a surfactant, a chain transfer agent, and a solvent may be used, and conventionally known ones each may be used.

As the surfactant, a known surfactant may be used, and examples thereof that can be used include nonionic surfactants, anionic surfactants, and cationic surfactants. Of these, a fluorine-containing anionic surfactant is preferable, and a linear or branched fluorine-containing anionic surfactant having 4 to 20 carbon atoms that may contain ether-bonded oxygen (that is, an oxygen atom is inserted between carbon atoms) is more preferable. The amount of the surfactant to be added (with respect to polymerization water) is preferably 50 to 5,000 ppm.

Examples of the chain transfer agent include hydrocarbons such as ethane, isopentane, n-hexane, and cyclohexane; aromatics such as toluene and xylene; ketones such as acetone; acetic acid esters such as ethyl acetate and butyl acetate; alcohols such as methanol and ethanol; mercaptans such as methyl mercaptan; and halogenated hydrocarbons such as carbon tetrachloride, chloroform, methylene chloride, and methyl chloride. The amount of the chain transfer agent to be added depends on the magnitude of the chain transfer constant of the compound to be used, and the chain transfer agent is usually used in the range of 0.01 to 20% by mass with respect to the polymerization solvent.

Examples of the solvent include water and mixed solvent of water and alcohol.

In suspension polymerization, a fluorinated solvent may be used in addition to water. Examples of the fluorinated solvent include hydrochlorofluoroalkanes such as $CH_3CClF_2$, $CH_3CCl_2F$, $CF_3CF_2CCl_2H$, and $CF_2ClCF_2CFHCl$; chlorofluoroalkanes such as $CF_2ClCFClCF_2CF3$ and $CF_3CFClCFClCF_3$; hydrofluoroalkanes such as $CF_3CFHCFHCF_2CF_2CF_3$, $CF_2HCF_2CF_2CF_2CF_2H$, and $CF_3CF_2CF_2CF_2CF_2CF_2H$; hydrofluoroethers such as $CH_3OC_2F_5$, $CH_3OC_3F_5CF_3CF_2CH_2OCHF_2$, $CF_3CHFCF_2OCH_3$, $CHF_2CF_2OCH_2F$, $(CF_3)_2CHCF_2OCH_3$, $CF_3CF_2CH_2OCH_2CHF_2$, and $CF_3CHFCF_2OCH_2CF_3$; and perfluoroalkanes such as perfluorocyclobutane, $CF_3CF_2CF_2CF_3$, $CF_3CF_2CF_2CF_2CF_3$, and $CF_3CF_2CF_2CF_2CF_2CF_3$, and of these, perfluoroalkanes are preferable. The amount of the fluorinated solvent to be used is preferably 10 to 100% by mass with respect to an aqueous medium in respect of suspendability and economic efficiency.

The polymerization temperature may be, but is not limited to, 0 to 100° C. The polymerization pressure is suitably determined according to the kind and amount of solvent to be used and other polymerization conditions such as vapor pressure and polymerization temperature, and usually may be 0 to 9.8 MPaG.

When the fluororesin is produced by emulsion polymerization, an aqueous dispersion in which fluororesin particles are dispersed is usually obtained. The fluororesin particles in the aqueous dispersion obtained by emulsion polymerization may be coagulated to recover the fluororesin. When the fluororesin is produced by suspension polymerization, a wet fluororesin usually can be recovered. The recovered fluororesin may be cleaned or dried.

The fluororesin of the present disclosure may be in any foam and may be in the foam of an aqueous dispersion, powder, pellets, or the like. The fluororesin of the present disclosure is preferably in the foam of pellets because it is easy to make the tensile strength retention ratio of the fluororesin higher and to reduce the extraction of the extract to be extracted in perfluorocyclobutane.

The fluororesin of the present disclosure can be suitably produced by polymerizing a fluorine-containing monomer to obtain a fluororesin, sufficiently cleaning the obtained fluororesin, drying the cleaned fluororesin, and forming the dried fluororesin into pellets using an extruder comprising a cylinder provided with a vent hole.

After the polymerization is finished, recovering and sufficiently cleaning the obtained fluororesin enables the tensile strength retention ratio of the fluororesin to be made higher and the extraction of the extract to be extracted in perfluorocyclobutane to be reduced. Examples of the cleaning method include a method involving mixing the fluororesin and water followed by stirring, a method involving repeating an operation of mixing the fluororesin and water followed by stirring and dehydrating, and a method involving placing the fluororesin in water and applying ultrasound thereto. The water obtained after the method is analyzed, and cleaning can be repeated until a result is achieved from which it is assumed that the intended tensile strength retention ratio and extraction of the fluororesin are reached.

Providing a vent hole on the cylinder included by the extruder for forming the fluororesin and removing volatiles generated from the melted fluororesin from the cylinder via the vent hole enables the tensile strength retention ratio of the fluororesin to be made higher and the extraction of the extract to be extracted in perfluorocyclobutane to be reduced. To the vent hole, a pressure reduction apparatus can be connected. Reducing the pressure in the cylinder around the vent hole (devolatilization region) enables removal of the volatiles to be facilitated. The absolute pressure of the devolatilization region may be 0.01 to 0.1 MPa.

The fluororesin of the present disclosure (or a composition containing the fluororesin of the present disclosure) may contain various additives, e.g., electroconductive materials, reinforcing agents, fillers, UV absorbers, and pigments as long as the object of the present disclosure is not impaired. Use of such additives enables the properties of the fluororesin to increase, such as electric conductivity, surface hardness, abrasion resistance, electrostatic properties, and weather resistance.

The fluororesin of the present disclosure (or a composition containing the fluororesin of the present disclosure) substantially includes no stabilizer such as a heat stabilizer, specifically cuprous oxide (copper (I) oxide), cupric oxide (copper (II) oxide), cuprous iodide, and cupric iodide. "Substantially includes no" means that cuprous oxide (copper (I) oxide), cupric oxide (copper (II) oxide), cuprous iodide, and cupric iodide are not positively added.

The laminate of the present disclosure comprises a fluororesin layer containing the fluororesin described above and a non-fluororesin layer containing a non-fluororesin.

The fluororesin layer may further contain an electroconductive filler in addition to the fluororesin. When the electroconductive filler is contained, it is possible to prevent build-up of static electricity resulting from, for example, friction between fuel or a Chemical solution and the laminate of the present disclosure, and thus prevent fire or explosion that may occur due to electrostatic discharge, or cracks or holes in the laminate of the present disclosure and fuel leakage resulting therefrom.

The electroconductive filler is not limited, and examples include powders of electroconductive simple substances or fibers of electroconductive simple substances such as metal and carbon; powders of electroconductive compounds such as zinc oxide; and powders having the surface which has been subjected to electroconductive treatment.

The powders of electroconductive simple substances or the fibers of electroconductive simple substances are not limited, and examples include metal powders of copper, nickel, and the like; metal fibers of iron, stainless steel, and the like; and carbon black, carbon fiber, carbon fibril described in, for example, Japanese Patent Laid-Open No. 3-174018, carbon nanotube, and carbon nanohorn.

The powders having the surface which has been subjected to electroconductive treatment are powders obtained by performing electroconductive treatment on the surface of non-electroconductive powders such as glass beads and titanium oxide. A method for the electroconductive treatment is not limited, and examples include metal sputtering and electroless plating. Among the electroconductive fillers described above, carbon black is advantageous in view of economy and is thus preferably used.

The content of the electroconductive filler is suitably determined according to the kind of fluororesin, the electroconductive performance required of a laminate, the molding conditions, and the like, and is preferably 1 to 30 parts by mass based on 100 parts by mass of the fluororesin. A more preferable lower limit is 5 parts by mass, and a more preferable upper limit is 20 parts by mass.

In addition to the electroconductive filler, the fluororesin layer may contain various additives, e.g., reinforcing agents, fillers, UV absorbers, and pigments as long as the object of the present disclosure is not impaired. Use of such additives enables the properties of the fluororesin layer to increase, such as surface hardness, abrasion resistance, electrostatic properties, and weather resistance.

The non-fluororesin layer is a layer containing a non-fluororesin. The laminate of the present disclosure, because of comprising the non-fluororesin layer, exerts excellent effects obtained by comprising the non-fluororesin layer, in addition to excellent effects obtained by comprising the fluororesin layer.

Examples of the non-fluororesin include resins that have excellent mechanical strength and can primarily serve to maintain pressure resistance and the shape of a molded body (hereinafter referred to as structural member-type resins) such as a polyamide resin, a polyolefin-based resin, a vinyl chloride-based resin, a polyurethane resin, a polyester resin, a polyaramid resin, a polyimide resin, a polyamide-imide resin, a polyphenylene oxide resin, a polyacetal resin, a polycarbonate resin, an acryl-based resin, a styrene-based resin, an acrylonitrile/butadiene/styrene resin [ABS], a cellulose-based resin, a polyether ether ketone resin [PEEK], a polysulfone resin, a polyether sulfone resin [PES], and a polyetherimide resin; and resins having high permeation resistance to fuel and gas (hereinafter referred to as permeation resistant resins) such as an ethylene/vinyl alcohol copolymer resin, a polyphenylene sulfide resin, a polybutylene naphthalate resin, a polybutylene terephthalate resin, and polyphthalamide [PPA].

The non-fluororesin, in particular, is preferably at least one selected from the group consisting of a polyamide resin, an ethylene/vinyl alcohol copolymer resin, and a polyolefin-based resin, more preferably at least one selected from the group consisting of a polyamide resin and an ethylene/vinyl alcohol copolymer resin, and even more preferably a polyamide resin.

The laminate of the present disclosure has excellent mechanical strength when the non-fluororesin layer contains the structural member-type resin, and the laminate of the present disclosure has excellent permeation resistance to fuel when the non-fluororesin layer contains the permeation resistant resin.

The polyamide resin is a polymer having an amide bond [—NH—C(=O)—] as a repeating unit within the molecule.

The polyamide resin may be any of a so-called nylon resin, which is a polymer in which an amide bond within the molecule is bonded to an aliphatic structure or an alicyclic structure, and a so-called aramid resin, which is a polymer in which an amide bond within the molecule is bonded to an aromatic structure.

The polyamide resin (nylon resin) is not limited, and examples include polymers such as polyamide 6, polyamide 66, polyamide 11, polyamide 12, polyamide 610, polyamide 1010, polyamide 612, polyamide 6/66, polyamide 66/12, polyamide 46, a metaxylylenediamine/adipic acid copolymer, polyamide 62, polyamide 92, polyamide 122 and polyamide 142, and aromatic polyamide such as polyamide 6T and polyamide 9T. Two or more of these may be used in combination.

The aramid resin is not limited, and examples include polyparaphenylene terephthalamide and polymetaphenylene isophthalamide.

The polyamide resin may be a polymer in which a structure without an amide bond as a repeating unit is block-copolymerized or graft-copolymerized with a part of the molecule. Examples of such polyamide resins include polyamide-based elastomers such as a polyamide 6/polyester copolymer, a polyamide 6/polyether copolymer, a polyamide 12/polyester copolymer, and a polyamide 12/polyether copolymer. These polyamide-based elastomers are obtained by block copolymerization of a polyamide oligomer and a polyester oligomer via an ester bond, or obtained by block copolymerization of a polyamide oligomer and a polyether oligomer via an ether bond. Examples of the polyester oligomer include polycaprolactone and polyethylene adipate, and examples of the polyether oligomer include polyethylene glycol, polypropylene glycol, and polytetramethylene glycol. The polyamide-based elastomer is preferably a polyamide 6/polytetramethylene glycol copolymer or a polyamide 12/polytetramethylene glycol copolymer.

Preferably the polyamide resin is, in particular, polyamide 6, polyamide 66, polyamide 11, polyamide 12, polyamide 610, polyamide 1010, polyamide 612, polyamide 62, polyamide 6/66, polyamide 66/12, a polyamide 6/polyester copolymer, a polyamide 6/polyether copolymer, a polyamide 12/polyester copolymer, a polyamide 12/polyether copolymer, or the like, in view of obtaining sufficient mechanical strength even when the layer famed of the polyamide resin is thin. Two or more of these may be used in combination.

The amine value of the polyamide resin is preferably 10 to 80 (eq/$10^6$ g). When the amine value is within the above range, excellent interlayer adhesion can be obtained even in the case of coextrusion at a relatively low temperature. When the amine value is less than 10 (eq/$10^6$ g), interlayer adhesion may be insufficient. When the amine value exceeds 80 (eq/$10^6$ g), the mechanical strength of the laminate is insufficient, and coloration likely occurs during storage, resulting in poor handleability. A more preferable lower limit is 15 (eq/$10^6$ g) and an even more preferable lower limit is 23 (eq/$10^6$ g), and a more preferable upper limit is 60 (eq/$10^6$ g) and an even more preferable upper limit is 50 (eq/$10^6$ g).

In the present disclosure, the amine value is a value obtained by thermally dissolving 1 g of a polyamide resin in 50 ml of m-cresol and titrating this solution with 1/10 N aqueous p-toluenesulfonic acid solution using thymol blue as an indicator. The amine value means the amine value of the polyamide resin before laminating unless specified otherwise. Among the amino groups of the polyamide resin before laminatinng, some are considered to be consumed for adhesion to the adjacent layer; however, since the amount of consumed amino groups is very small relative to the entire layer, the amine value of the polyamide resin before laminating and the amine value of the laminate of the present disclosure are substantially comparable.

The polyolefin-based resin is a resin having a monomer unit derived from a vinyl group-containing monomer that does not have a fluorine atom. The vinyl group-containing monomer that does not have a fluorine atom is not limited, and preferably has the above-described polar functional group in applications in which interlayer adhesion is required.

The polyolefin-based resin is not limited, and examples include polyolefins such as polyethylene, polypropylene, high-density polyolefin, and low-density polyolefin, and also modified polyolefins obtained by modifying the above polyolefins with maleic anhydride or the like, epoxy-modified polyolefins, and amine-modified polyolefins. Among these, high-density polyolefin is preferable.

The ethylene/vinyl alcohol copolymer resin is obtained by saponifying an ethylene/vinyl acetate copolymer obtained from ethylene and vinyl acetate. The content ratio between ethylene and vinyl acetate to be copolymerized is suitably determined according to the proportion of the number of moles of the vinyl acetate unit to be specified by a formula mentioned below.

A preferable ethylene/vinyl alcohol copolymer resin is one in which the vinyl acetate unit X mol % and the saponification degree Y % satisfy X×Y/100≥7. If X×Y/100<7, interlayer adhesion may be insufficient. X×Y/100≥10 is more preferable. The value of X×Y/100 is a measure of a content of the hydroxyl group included by the ethylene/vinyl alcohol copolymer resin, and a larger value of X×Y/100 means a higher content of the hydroxyl group included by the ethylene/vinyl alcohol copolymer resin.

The hydroxyl group is a group that may involve in adhesion with a counterpart material to be laminated with the EVOH layer. A higher content of the hydroxyl group in the ethylene/vinyl alcohol copolymer resin causes the interlayer adhesion in the laminate to increase. In the present disclosure, the "counterpart material to be laminated" described above refers to a material laminated contiguously.

In the present disclosure, the "vinyl acetate unit X mol %" is the proportion of the number of moles of vinyl acetate [Ni] derived from vinyl acetate unit with respect to the total number of moles [N] of ethylene and vinyl acetate added in the molecule of the ethylene/vinyl alcohol copolymer resin, meaning the average value of the molar content Xi represented by the following formula:

$$Xi(\%)=(Ni/N)\times 100.$$

The vinyl acetate unit X mol % is a value obtained by measurement using infrared absorption spectroscopy [IR].

In the present disclosure, the "vinyl acetate unit" is a portion on the molecular structure of the ethylene/vinyl alcohol copolymer resin, meaning the portion derived from vinyl acetate. The vinyl acetate unit may be saponified and have a hydroxyl group or may not be saponified and have an acetoxy group.

The "saponification degree" is a percentage representing the proportion of the number of saponified vinyl acetate units with respect to the total of the number of saponified vinyl acetate unit and number of unsaponified vinyl acetate units. The saponification degree is a value obtained by measuring using infrared absorption spectroscopy [IR].

Examples of an ethylene/vinyl alcohol copolymer resin in which X and Y satisfy the formula described above include commercially available products such as EVAL F101 (manufactured by Kuraray Co., Ltd., vinyl acetate unit X=68.0 mol %; saponification degree Y=95%; X×Y/100=64.6), Melthene H6051 (manufactured by TOSOH CORPORATION, vinyl acetate unit X=11.2 mol %; saponification degree Y=100%; X×Y/100=11.2), and TECHNO-LINK K200 (manufactured by Taoka Chemical Co., Ltd., vinyl acetate unit X=11.2 mol %; saponification degree Y=85%; X×Y/100=9.52).

A preferable ethylene/vinyl alcohol copolymer resin has a MFR at 200° C. of 0.5 to 100 g/10 min. A case in which the MFR is less than 0.5 g/10 min or more than 100 g/10 min is not preferable because the difference between the melt viscosity of the ethylene/vinyl alcohol copolymer resin and the melt viscosity of the counterpart material tends to increase and thus unevenness may occur in the thickness of each layer. The preferable lower limit is 1 g/10 min, and the preferable upper limit is 50 g/10 min.

The non-fluororesin preferably has a melting point of 50 to 400° C. The lower limit is more preferably 100° C. and even more preferably 150° C. The upper limit is more preferably 300° C. and even more preferably 250° C.

The melting point is obtained as a temperature corresponding to the maximum value in the heat-of-fusion curve when the temperature is raised at a rate of 10° C./min using a differential scanning calorimeter (DSC) (manufactured by Seiko Instruments Inc.).

The non-fluororesin layer may contain various additives, e.g., stabilizers such as heat stabilizers, reinforcing agents, fillers, UV absorbers, and pigments as long as the object of the present disclosure is not impaired. Use of such additives enables the properties of the non-fluororesin to increase, such as thermal stability, surface hardness, abrasion resistance, electrostatic properties, and weather resistance.

The laminate of the present disclosure preferably comprises a fluororesin layer and a polyamide resin layer containing a polyamide resin as a non-fluororesin layer. In the laminate of the present disclosure, the fluororesin layer and the polyamide resin layer are preferably directly adhered because excellent interlayer adhesive strength is obtained without providing an adhesive layer or the like. Examples of the laminate of the present disclosure include a laminate comprising a fluororesin layer/a polyamide resin layer as the innermost layer/outermost layer. A laminate comprising a fluororesin layer and a polyamide resin layer can combine excellent properties included by the fluororesin, such as oil resistance, fuel barrier properties, Chemical resistance, low Chemical solution permeability, heat resistance, weather resistance, and contamination resistance and properties included by the polyamide resin, such as high strength, high toughness, lightweight and excellent processability, and in particular, flexibility.

When the polyamide resin has the amine value mentioned above, the fluororesin layer and the polyamide resin layer can be adhered particularly firmly. The interlayer adhesive strength between the fluororesin layer and the polyamide resin layer is preferably 30 N/cm or more.

The interlayer adhesive strength is determined by conducting a 180° delamination test using a Tensilon Universal Tester at a speed of 25 mm/min.

The laminate of the present disclosure preferably comprises a fluororesin layer and an ethylene/vinyl alcohol copolymer (EVOH) layer containing an EVOH resin. The laminate comprising a fluororesin layer and an EVOH layer can combine excellent properties included by the fluororesin, such as oil resistance, fuel barrier properties, chemical resistance, low chemical solution permeability, heat resistance, weather resistance, and contamination resistance and properties included by the EVOH such as fuel barrier properties and low chemical solution permeability.

The laminate of the present disclosure more preferably further comprises a polyamide resin layer in addition to the fluororesin layer and EVOH layer because excellent interlayer adhesive strength is obtained and excellent properties of the 3 resins are obtained. In the laminate of the present disclosure, it is preferred that the fluororesin layer and the polyamide resin layer be directly adhered and the polyamide resin layer and the EVOH layer be directly adhered because excellent interlayer adhesive strength is obtained without providing an adhesive layer or the like.

Examples of the laminate of the present disclosure include:
 a laminate comprising a fluororesin layer/a polyamide resin layer as innermost layer/outermost layer,
 a laminate comprising a fluororesin layer/an EVOH layer/a polyamide resin layer and a laminate comprising a fluororesin layer/a polyamide resin layer/a EVOH layer, as innermost layer/intermediate layer/outermost layer,
 a laminate comprising a fluororesin layer/a polyamide resin layer/an EVOH layer/a polyamide resin layer as innermost layer/inner layer/intermediate layer/outermost layer,
 a laminate comprising a fluororesin layer/a polyamide resin layer/an EVOH layer/a polyamide resin layer/a polyamide resin layer and a laminate comprising a fluororesin layer/a polyamide resin layer/an EVOH layer/a polyamide resin layer/a polyolefin resin layer, as innermost layer/inner layer/intermediate layer/outer layer/outermost layer, and
 a laminate comprising a fluororesin layer/a polyamide resin layer/a polyamide resin layer/an EVOH layer/a polyamide resin layer/a polyamide resin layer, a laminate comprising a fluororesin layer/a polyamide resin layer/an EVOH layer/a polyamide resin layer/a polyamide resin layer/a polyolefin resin layer, a laminate comprising a fluororesin layer/a polyamide resin layer/an EVOH layer/polyamide resin layer/a polyolefin resin layer/polyamide resin layer, and a laminate comprising a fluororesin layer/a fluororesin layer/a polyamide resin layer/an EVOH layer/a polyamide resin layer/a polyolefin resin layer, as innermost layer/inner layer 1/inner layer 2/intermediate layer/outer layer/outermost layer.

When the laminate of the present disclosure comprises two or more fluororesin layers, the fluororesins contained in each layer may be of the same or different kind. When the laminate of the present disclosure comprises two or more polyamide resin layers, the polyamide resins contained in each layer may be of the same or different kind. When the laminate of the present disclosure comprises two or more EVOH layers, the ethylene/vinyl alcohol copolymers contained in each layer may be of the same or different kind. In the laminate of the present disclosure, the boundary between the layers that are in contact does not necessarily need to be clear, and the laminate may have a layer structure having a concentration gradient in which the molecular chains of the polymers forming the respective layers mutually enter the layers from the surfaces in contact with each other.

The laminate of the present disclosure may have another layer. The thickness, shape, and the like of each layer of the laminate of the present disclosure may be suitably selected according to the purpose of use, the situation of use, and the like.

A monolayer tube (hose) of the present disclosure contains the fluororesin described above. A multilayer tube (hose) of the present disclosure is famed of the laminate described above. In any tube, the inner surface of the tube is preferably formed of the fluororesin described above. The fluororesin, having a markedly large tensile strength retention ratio, enables the inner surface of a tube famed of the fluororesin to be markedly smooth. The fluororesin, which has a markedly small extraction of an extract to be extracted in perfluorocyclobutane, enables the inner surface of a tube foiled of the fluororesin to be markedly smooth. The surface roughness Ra of the inner surface of the tube is 1.0 µm or less, for example, preferably 0.5 µm or less, more preferably 0.2 µm or less, and may be 0.01 µm or more. The surface roughness can be measured in accordance with JIS B0601-1994.

The outer diameter of the tube is preferably 2 to 20 mm, more preferably 3 mm or more, even more preferably 4 mm or more, most preferably 6 mm or more, more preferably 18 mm or less, even more preferably 16 mm or less, and most preferably 14 mm or less.

The inner diameter of the tube is preferably 1 to 15 mm, more preferably 2 mm or more, even more preferably 3 mm or more, most preferably 4 mm or more, more preferably 13 mm or less, even more preferably 11 mm or less, and most preferably 10 mm or less.

The thickness (the difference between the outer diameter and the inner diameter) of the tube is preferably 0.5 to 8 man, more preferably 0.6 to 6 ran, even more preferably 0.6 to 4 mm, and most preferably 0.7 to 2 mm.

The thickness of the fluororesin layer in the laminate and the tube is preferably 0.05 to 0.4 mm, more preferably 0.06 to 0.3 mm, and even more preferably 0.07 to 0.25 mm. When the laminate and the tube comprise two or more fluororesin layers, the thickness of the fluororesin layer is the total thickness of the layers.

The thickness of the non-fluororesin layer in the laminate and the tube is preferably 0.05 to 4 mm, more preferably 0.1 to 3 mm, and even more preferably 0.5 to 2 mm. When the laminate and the tube comprises two or more non-fluororesin layers, the thickness of the non-fluororesin layer is the total thickness of the layers.

When the laminate and the tube have a two-layer structure of innermost layer/outermost layer, the thickness of the innermost layer is preferably 0.05 to 0.4 mm, more preferably 0.06 to 0.3 mm, and even more preferably 0.07 to 0.25 mm. The thickness of the outermost layer is preferably 0.05 to 4 mm, more preferably 0.1 to 3 mm, and even more preferably 0.5 to 2 mm.

When the laminate and the tube has a five-layer structure of innermost layer/inner layer/intermediate layer/outer layer/outermost layer, the thickness of the innermost layer is preferably 0.01 to 0.5 mm, more preferably 0.02 to 0.25 mm, and even more preferably 0.03 to 0.15 mm.

The thickness of the inner layer is preferably 0.01 to 1.0 mm, more preferably 0.03 to 0.5 mm, and even more preferably 0.05 to 0.3 mm.

The thickness of the intermediate layer is preferably 0.01 to 0.5 mm, more preferably 0.02 to 0.25 mm, and even more preferably 0.03 to 0.15 mm.

The thickness of the outer layer is preferably 0.01 to 1.0 mm, more preferably 0.03 to 0.5 mm, and even more preferably 0.05 to 0.3 mm.

The thickness of the outermost layer is preferably 0.01 to 1.0 mm, more preferably 0.03 to 0.7 mm, and even more preferably 0.05 to 0.5 mm.

The fluororesin of the present disclosure, which is excellent in oil resistance, fuel barrier properties, chemical resistance, low chemical solution permeability, heat resistance, weather resistance, contamination resistance, and the like, can be used in various fields such as semiconductor, automobile, construction, electric and electronic, chemical plant, and pharmaceutical-related fields. Further, the fluororesin of the present disclosure has high adhesion to other materials. Thus, even when a tube is produced by extruding at a high line speed using the fluororesin of the present disclosure, a tube can be obtained which comprises firmly adhered layers and has a smooth inner surface. The fluororesin of the present disclosure can be extruded not only at a high line speed but also at a low line speed. Accordingly, the fluororesin of the present disclosure can be suitably used particularly for laminates and tubes.

The fluororesin of the present disclosure can be formed to obtain various molded products such as films, sheets, tubes (hoses), bottles, and tanks. Molded products containing the fluororesin of the present disclosure are excellent in oil resistance, fuel barrier properties, chemical resistance, low chemical solution permeability, heat resistance, weather resistance, contamination resistance, and the like.

The laminate of the present disclosure can have various shapes such as a film shape, a sheet shape, a tube (hose) shape, a bottle shape, and a tank shape. The film shape, the sheet shape, the tube shape, and the hose shape may have a wavy shape, a corrugated shape, a convoluted shape, or the like.

The tube (hose) may have a wavy shape, a corrugated shape, a convoluted shape, or the like. When the tube (hose) has a wavy shape, having a region in which a plurality of annular ridges and grooves in a wavy foam are provided, one side of the annulus can be compressed and the other side can be expanded outward in that region, which enables ease of bending the laminate by a desired angle without causing stress fatigue or interlayer delamination.

The method of forming the wavy region is not limited, and the wavy region can be easily famed by creating a straight tube and then, for example, mold-shaping the tube into a predetermined wavy shape or the like.

Examples of a method for forming the fluororesin include, but are not limited to, a heat compression molding method, a transfer molding method, an extrusion forming method, an injection molding method, and a calender molding method. For forming, molding machines for fluoropolymers commonly used such as an injection molding machine, a blow molding machine, an extruder, and various coating machines can be used to produce molded products and laminates of various shapes such as a sheet shape and a tube shape. Forming methods such as multilayer extrusion forming, multilayer blow molding, and multilayer injection molding can produce multilayer molded products such as multilayer tubes, multilayer hoses, and multilayer tanks.

Examples of the method for producing the laminate of the present disclosure include:

(1) a method involving forming a laminate having a multilayer structure in one step by coextruding the polymers that foam the respective layers to thermally fuse (melt-adhere) the layers (coextrusion molding);

(2) a method involving laminating the layers that are separately prepared by an extruder and adhering the layers by thermal fusion;

(3) a method involving forming a laminate by extruding by an extruder, onto the surface of a layer prepared in advance, a polymer that forms a layer to be adjacent to the aforementioned layer; and (4) a method involving electrostatically coating the surface of a layer prepared in advance with a polymer that forms a layer to be adjacent to the aforementioned layer, and then heating the resulting coated product entirely or from the coated side to thermally melt the polymer subjected to coating, to thereby form a layer.

When the laminate of the present disclosure is a tube or a hose, a method corresponding to the above (2) is (2a) a method involving separately forming each cylindrical layer by an extruder and coating the layer to be an inner layer with the other layer as a heat-shrinkable tube to be in contact with the inner layer; a method corresponding to the above (3) is (3a) a method involving, first, forming a layer to be an inner layer by an inner-layer extruder and forming a layer that is to be in contact with the aforementioned layer on the outer circumferential surface thereof by an outer-layer extruder; and a method corresponding to the above (4) is (4a) a method involving electrostatically applying a polymer for forming an inner layer to the inside of a layer to be in contact with the inner layer, and then placing the resulting coated product in a heating oven to heat the coated product entirely or inserting a rod-shaped heating device into the cylindrical coated product to heat the cylindrical coated product from inside, to thereby thermally melting and molding the polymer for the inner layer.

As long as each layer of the laminate and the tube of the present disclosure can be coextruded, the laminate is generally famed by the coextrusion molding of the above (1). Examples of the coextrusion molding include conventionally known multi-layer coextrusion production methods such as a multi-manifold method and a feed block method.

In the molding methods (2) and (3) above, after each layer is famed, the surface of each layer that comes into contact with another layer may be surface-treated in order to increase interlayer adhesion. Examples of such surface treatment include etching treatment such as sodium etching treatment; corona treatment; and plasma treatment such as low-temperature plasma treatment.

As a method for molding the laminate of the present disclosure, it is also possible to use a molding method involving laminating a plurality of materials in multiple stages by rotational molding. In this case, the melting point of the outer-layer material does not necessarily need to be higher than the melting point of the inner-layer material, and the melting point of the inner-layer material may be 100° C. or more higher than the melting point of the outer-layer material. In this case, preferably there is also a heating part inside.

The laminate and tube of the present disclosure can be produced by extruding the fluororesin at a high line speed. The line speed is preferably 15 m/min or more, more preferably 20 m/min or more, and may be 100 m/min or less. The laminate of the present disclosure, even if obtained by forming at such a high line speed, comprises firmly adhered layers and has a smooth surface. The tube of the present disclosure, even if obtained by forming at such a high line speed, has a smooth inner surface. The laminate and the tube of the present disclosure also can be produced by extruding a fluororesin at a low line speed. The line speed may be 8 to 100 m/min, for example.

The laminate and the tube of the present disclosure can be produced by forming a fluororesin and other materials as required using an extruder. As the extruder, an extruder comprising a cylinder, an adapter, and a spiral multimanifold die or crosshead die having a die head and a die chip can be used, but is not limited thereto.

An extruder usually comprises a hopper, a screw, a cylinder, an adapter (a connecting portion for the screw and a die), and a die. An extruder comprising a screw may be a single screw extruder or a twin screw extruder. Volatile components generated from the fluororesin also can be removed by providing the cylinder with a vent hole to open the vent hole or reduce the pressure.

The cylinder temperature is preferably 150 to 350° C. and more preferably 180 to 330° C. The die temperature is preferably 230 to 330° C. and more preferably 250 to 320° C. The chip temperature is preferably 230 to 330° C. and more preferably 250 to 320° C. A laminate having a smoother surface or a tube having a smoother inner surface can be obtained by setting the die temperature and the chip temperature within the range described above. Particularly when a polyamide resin or an ethylene/vinyl alcohol copolymer resin is coextruded with a fluororesin (for example, ETFE) to produce a laminate or a multilayer tube, the die temperature and the chip temperature described above are preferably set as described above in order to obtain a laminate having a smoother surface or a tube having a smoother inner surface.

The fluororesin, laminate, and tube of the present disclosure can be used in the following applications.

Films and sheets: such as food films, food sheets, Chemical films, release films, chemical sheets, agricultural films, diaphragms of diaphragm pumps, and various packings, tubes and hoses: such as chemical solution tubes or chemical solution hoses, coating material tubes or coating material hoses (including printer applications), fuel tubes or fuel hoses such as automobile fuel tubes or automobile fuel hoses, solvent tubes or solvent hoses, automobile radiator hoses, air conditioner hoses, brake hoses, wire claddings, food and beverage tubes or food and beverage hoses, underground tubes or hoses for gas stations, and submarine oil field tubes or hoses (including injection tubes and crude oil transfer tubes), bottles, containers, and tanks: such as automobile radiator tanks, fuel tanks such as gasoline tanks, solvent tanks, coating material tanks, chemical solution containers such as semiconductor Chemical solution containers, and food and beverage tanks, and others: such as various automobile seals such as carburetor flange gaskets and fuel pump O-rings, various machine-related seals such as hydraulic equipment seals, gears, medical tubes (including catheters), and cableway pipes.

Embodiments have been described above, but it will be understood that various changes in forms and details can be made without departing from the gist and the scope of the claims.

The present disclosure provides a fluororesin having a tensile strength retention ratio of 50% or more, the tensile strength retention ratio being calculated by the following formula from the tensile strength of the fluororesin after a heat treatment obtained by conducting a heat treatment at 130° C. for 40,000 hours, and the tensile strength of the fluororesin before the heat treatment.

$$\text{Tensile strength retention ratio (\%)} = (\text{tensile strength of fluororesin after heat treatment (MPa)})/(\text{tensile strength of fluororesin before heat treatment (MPa)}) \times 100$$

The present disclosure also provides a fluororesin of which the extraction of an extract extracted in perfluorocyclobutane is 0.3% by mass or less, upon immersion of the fluororesin in perfluorocyclobutane at 60° C. for 10 days, based on the mass of the fluororesin immersed.

The fluororesin is preferably a melt-fabricable fluororesin.

It is preferred that the fluororesin have at least one selected from the group consisting of a carbonate group and a carboxylic halide group and that the total number of carbonate groups and carboxylic halide groups be 3 to 800 per $10^6$ main-chain carbon atoms.

The fluororesin preferably contains ethylene unit and tetrafluoroethylene unit.

The fluororesin preferably further contains hexafluoropropylene unit.

The fluororesin preferably contains chlorotrifluoroethylene unit and tetrafluoroethylene unit.

The present disclosure also provides a laminate comprising a fluororesin layer containing the fluororesin described above and a non-fluororesin layer containing a non-fluororesin.

The laminate preferably contains a polyamide resin layer containing a polyamide resin as the non-fluororesin layer.

It is preferred that the fluororesin layer and the polyamide resin layer be adhered and that the interlayer adhesive strength between the fluororesin layer and the polyamide resin layer be 30 N/cm or more.

The laminate preferably comprises an ethylene/vinyl alcohol copolymer (EVOH) layer containing an EVOH resin as the non-fluororesin layer.

The present disclosure also provides a multilayer tube formed of the laminate described above.

The present disclosure also provides a monolayer tube containing the fluororesin described above.

It is preferred that the inner surface of the tube be formed of the fluororesin and that the inner surface have a surface roughness Ra of 1.0 µm or less.

EXAMPLES

Next, embodiments of the present disclosure will now be described by way of Examples, but the present disclosure is not limited solely to the Examples.

The numerical values of the Examples were measured by the following methods.

<Polymer Composition>

$^{19}$F-NMR measurement was conducted using pellets of the fluororesin obtained in each Example and a nuclear magnetic resonance apparatus AC300 (manufactured by Bruker-Biospin AG) to determine the polymer composition from the integrated values of peaks. Depending on the kind of monomer, the results of elemental analysis were suitably combined to determine the polymer composition (the content of each monomer unit of the polymer).

<Melting Point>

Thermal measurement was conducted using pellets of the fluororesin obtained in each Example and a differential scanning calorimeter REC220 (manufactured by Seiko Instruments Inc.) in accordance with ASTM D 4591 at a temperature-increasing rate of 10° C./min, and the melting point of the fluororesin was determined from the peak of the endothermic curve obtained.

<Melt Flow Rate (MFR)>

The mass (g/10 min) of the fluororesin flowing out from a nozzle having an inner diameter of 2 mm and a length of 8 mm per 10 minutes at 265° C. or 297° C. under a load of 5 kg was determined as the MFR using pellets of the fluororesin obtained in each Example and a melt indexer (manufactured by Yasuda Seiki Seisakusho Ltd.) in accordance with ASTM D 1238.

<Number of Carbonate Groups and Carboxylic Acid Fluoride Groups>

Pellets of the fluororesin obtained in each Example were compression-molded at room temperature to produce films having a thickness of 50 to 200 µm. In an infrared absorption spectrum analysis of this film, a peak assigned to the carbonyl group of a carbonate group [—OC(=O)O—] appears at an absorption wavelength of 1817 cm$^{-1}$ [$v_{(C=O)}$], and a peak assigned to the carbonyl group of a carboxylic acid fluoride group [—COF] appears at an absorption wavelength of 1884 cm$^{-1}$ [$\Xi_{(C=O)}$], and thus the absorbance of the $v_{(C=O)}$ peaks was measured. The number of carbonate groups per 10$^6$ main-chain carbon atoms of the fluororesin was calculated according to the following formula.

Number of carbonate groups or carboxylic acid fluoride groups (per 10$^6$ main-chain carbon atoms)= (1×K)/t l: Absorbance
K: Correction factor (—OC(=O)O—R: 1426, —COF: 405)
t: Film thickness (mm)

The infrared absorption spectrum analysis was conducted by scanning 40 times using a Perkin-Elmer MIR spectrometer 1760X (manufactured by The Perkin-Elmer Corporation). The obtained IR spectrum was subjected to automatic baseline judgment by Perkin-Elmer Spectrum for Windows Ver. 1.4C to measure the absorbance of the peaks at 1817 cm$^{-1}$ and 1884 cm$^{-1}$. The thickness of the films was measured with a micrometer gauge.

<Tensile Strength>

Pellets of the fluororesin obtained in each Example were compression-molded at room temperature to produce a film having a thickness of 2.0 mm. A test piece (ASTM V-type dumbbell) was produced from the obtained film. The tensile strength was measured using the obtained test piece and a tensile testing machine (AUTOGRAPH AG-1 manufactured by Shimadzu Corporation) in accordance with ASTM D 638 under conditions of a distance between chucks of 25 mm and a tensile rate of 50 mm/min.

<Tensile Strength Retention Ratio>

The test piece obtained above (ASTM V-type dumbbell) was placed in an electric furnace, a heat treatment at 130° C. for 40,000 hours was conducted, and then the test piece was taken out of the electric furnace and allowed to cool to normal temperature. The tensile strength of the test piece after the heat treatment was measured by the method described above, and the tensile strength retention ratio was calculated according to the following formula. Further, a heat treatment was conducted for 40,000 hours also at an arbitrary temperature higher than 130° C. in order to grasp the temperature at which the tensile strength retention ratio reaches 50%, and the tensile strength retention ratio was calculated in the same manner.

Tensile strength retention ratio (%)=(tensile strength of fluororesin after heat treatment (MPa))/(tensile strength of fluororesin before heat treatment (MPa))×100

<Extraction in Perfluorocyclobutane>

The entire pellets, about 10 g, of the fluororesin obtained in each Example were immersed in perfluorocyclobutane and allowed to be left at 60° C. for 10 days (240 hours). Thereafter, the pellets were taken out and the perfluorocyclobutane was recovered. The obtained perfluorocyclobutane was dried at room temperature for one week or more and heated to completely remove the perfluorocyclobutane, and the mass of the extract (dry mass of the residue) was weighed. The proportion of the mass of the extract based on the mass of the immersed pellets (fluororesin) was calculated as the extraction according to the following formula.

Extraction (% by mass)=(mass of extract (dry mass of residue) (g))/(mass of pellets immersed in perfluorocyclobutane (g))×100

<Initial Pyrolysis Temperature>

Pellets of the fluororesin obtained in each Example were heated at 10° C./min under an air atmosphere using a thermogravimeter-differential thermal analyzer TG/DTA6200 or TG/DTA7200 (manufactured by Hitachi High-Tech Science Corporation), and the temperature when the mass reduction of the fluororesin reached 1% by mass was defined as the initial pyrolysis temperature.

Example 1

Production of Fluororesin A

380 L of distilled water was placed in an autoclave. After sufficient nitrogen purging, 166 kg of octafluorocyclobutane, 83 kg of HFP, and 0.3 kg of perfluoro(1,1,5-trihydro-1-pentene) ($CH_2=CF(CF_2)_3H$) were loaded, and the inside of the system was kept at 35° C. and a stirring speed of 200 rpm. Thereafter, TFE was injected up to 0.87 MPa, and further subsequently, Et was injected up to 0.95 MPa. Then, 6.3 kg of di-n-propyl peroxydicarbonate was placed, and polymerization was started. The pressure inside the system decreases as the progress of the polymerization, and thus a gas mixture of TFE/Et/EFP=46/44/10 mol % was continuously supplied to keep the pressure inside the system at 0.95 MPa. Then, perfluoro(1,1,5-trihydro-1-pentene) was continuously loaded up to a total amount of 3.2 kg, and stirring was continued for 23 hours. The pressure was released to atmospheric pressure, and the reaction product was recovered.

The recovered reaction product was placed in 1,000 kg of distilled water and cleaned by stirring for 60 minutes. This cleaning operation was repeated twice in total. The fluororesin obtained by cleaning was dried to obtain 250 kg of a powdery fluororesin.

The powdery fluororesin was placed in a 50 mmφ single screw extruder comprising a cylinder having a vent hole. The fluororesin was melted in the cylinder at 220° C. while volatiles generated from the fluororesin were removed via the vent hole, and extruded from the extruder to form the fluororesin into cylindrical pellets (diameter: 2.5 mm, length: 2.5 mm).

The physical properties of the obtained pelletized fluororesin A are shown below.

Polymer composition (mol %): TFE/Et/HFP/perfluoro(1,1,5-trihydro-1-pentene)=45.5/44.4/9.5/0.6
Melting point: 197° C.
Melt flow rate (265° C.): 26.3 g/10 min
Number of carbonate groups and carboxylic acid fluoride groups: 237/10$^6$C
Tensile strength retention ratio (130° C.): 50% or more
Tensile strength retention ratio (139° C.): 50%
Extraction in perfluorocyclobutane: 0.16% by mass
Initial pyrolysis temperature: 360° C.

Example 2

Production of Fluororesin B

380 L of distilled water was placed in an autoclave. After sufficient nitrogen purging, 230 kg of octafluorocyclobutane and 0.9 kg of perfluoro (1,1, 5-trihydro-1-pentene) ($CH_2=CF(CF_2)_3H$) were loaded, and the inside of the system was kept at 20° C. and a stirring speed of 200 rpm. Thereafter, TFE was injected up to 0.78 MPa, and further subsequently, Et was injected up to 0.89 MPa. After the inside of the system was set to 35° C., 1.1 kg of cyclohexane was loaded, 1.2 kg of a 50% di-n-propyl peroxydicarbonate solution in methanol was placed, and polymerization was started. The pressure inside the system decreases as the progress of the polymerization, and thus a gas mixture of TFE/Et=57/43 mol % was continuously supplied to keep the pressure inside the system at 1.2 MPa. Then, perfluoro(1,1,5-trihydro-1-pentene) was continuously loaded up to a total amount of 6.0 kg, and stirring was continued for 26 hours. The pressure was released to atmospheric pressure, and the reaction product was recovered.

The recovered reaction product was placed in 1,000 kg of distilled water and cleaned by stirring for 60 minutes. This cleaning operation was repeated twice in total. The fluororesin obtained by cleaning was dried to obtain 200 kg of a powdery fluororesin.

The powdery fluororesin was placed in a 50 mmφ single screw extruder comprising a cylinder having a vent hole. The fluororesin was melted in the cylinder at 300° C. while volatiles generated from the fluororesin were removed via the vent hole, and extruded from the extruder to foam the fluororesin into cylindrical pellets (diameter: 2.5 mm, length: 2.5 mm).

The physical properties of the obtained pelletized fluororesin B are shown below.

Polymer composition (mol %): TFE/Et/perfluoro(1,1,5-trihydro-1-pentene)=57.2/41.6/1.2
Melting point: 256° C.
Melt flow rate (297° C.): 22.5 g/10 min
Number of carbonate groups and carboxylic acid fluoride groups: 211/10$^6$C
Tensile strength retention ratio (130° C.): 50% or more
Tensile strength retention ratio (151° C.): 50%
Extraction in perfluorocyclobutane: 0% by mass
Initial pyrolysis temperature: 374° C.

Example 3

Production of Fluororesin C

To a stirring polymerization vessel equipped with a jacket capable of containing 174 kg of water, 51.5 kg of distilled water was loaded. After the inside space was sufficiently purged with pure nitrogen gas, the nitrogen gas was eliminated by vacuum. Then, 40.6 kg of octafluorocyclobutane, 1.3 kg of CTFE, 4.5 kg of TFE, and 2.8 kg of PPVE were injected. 0.075 kg of n-propyl alcohol was added as a chain transfer agent, the temperature was adjusted to 35° C., and stirring was started. 0.38 kg of a 50% by mass di-n-propyl peroxydicarbonate solution in methanol was added thereto as a polymerization initiator, and polymerization was started. During the polymerization, a monomer mixture prepared to have the same composition as a desired copolymer composition was additionally loaded such that the pressure inside the vessel was maintained at 0.66 MPa, and the stirring was continued. The pressure was released to atmospheric pressure, and the reaction product was recovered.

The recovered content was placed in 150 kg of distilled water and cleaned by stirring for 60 minutes. This cleaning operation was repeated twice in total. The fluororesin obtained by cleaning was dried to obtain 30 kg of a powdery fluororesin.

The powdery reaction product was placed in a 50 mmφ single screw extruder comprising a cylinder having a vent hole. The fluororesin was melted in the cylinder at 270° C. while volatiles generated from the fluororesin were removed via the vent hole, and extruded from the extruder to form the fluororesin into cylindrical pellets (diameter: 2.5 mm, length: 2.5 mm).

The physical properties of the obtained pelletized fluororesin C are shown below.

Polymer composition (mol %): CTFE/TFE/PPVE=21.0/76.5/2.5
Melting point: 248° C.
Melt flow rate (297° C.): 29.7 g/10 min
Number of carbonate groups and carboxylic acid fluoride groups: 182/10$^6$C
Tensile strength retention ratio (130° C.): 50% or more
Tensile strength retention ratio (220° C.): 50%
Extraction in perfluorocyclobutane: 0.01% by mass
Initial pyrolysis temperature: 425° C.

Laminates to be obtained by using the produced fluororesins A to C will be described with reference to Examples. The physical properties of the laminates were measured by the following methods.

<Adhesive Strength>

A 1 cm-width test piece was cut off from the tube obtained in each Example and subjected to a 180° delamination test at a speed of 25 mm/min using a Tensilon Universal Tester. The average of 5 local maximum points in the elongation amount—tensile strength graph was determined as the adhesive strength (N/cm).

<Surface Roughness Ra>

A test piece was produced by cutting the tube obtained in each Example, and the surface roughness Ra was measured at a point of the test piece corresponding to the inner surface of the tube. Measurement at 5 measurement points was repeated 3 times using a surface roughness measuring machine (SURFTEST SV-600 manufactured by Mitutoyo Corporation) in accordance with JIS B0601-1994, and the average of the obtained measurements was defined as the surface roughness Ra.

In Examples, the following materials were used in addition to the fluororesin A.

Polyamide 12
  Vestamid X7297 manufactured by Daicel-Evonik Ltd.
Polyamide 612
  Vestamid SX8002 manufactured by Daicel-Evonik Ltd.
  Ethylene/vinyl alcohol copolymer resin
  F101B manufactured by Kuraray Co., Ltd.

Example 4

Production of Laminate

Using a five-component five-layer tube extrusion apparatus equipped with a multimanifold (manufactured by Pla Giken Co., Ltd.), polyamide 12 as a layer (E), polyamide 612 as layers (B and D), an ethylene/vinyl alcohol copolymer resin as a layer (C), and the fluororesin A as a layer (A) were fed to five extruders, respectively, to mold a 5-component 5-layer multilayer tube having an outer diameter of 8 mm and an inner diameter of 6 mm, according to the extrusion conditions shown in Table 2. The multilayer tube has a layer arrangement of the layer (A)/layer (B)/layer (C)/layer (D)/layer (E), and the layer (A) is the innermost layer. The evaluation results are shown in Table 2.

Example 5

Using a two-component two-layer tube extrusion apparatus equipped with a multimanifold (manufactured by PLA-BOR Research Laboratory of Plastics Technology Co., Ltd.), polyamide 12 as a layer (B) and the fluororesin A as a layer (A) were fed to two extruders, respectively, to mold a two-component two-layer multilayer tube having an outer diameter of 8 mm and an inner diameter of 6 mm, according to the extrusion conditions shown in Table 2. The multilayer tube has a layer arrangement of the layer (A)/layer (B), and the layer (A) is the innermost layer. The evaluation results are shown in Table 2.

Example 6

Using a two-component two-layer tube extrusion apparatus equipped with a multimanifold (manufactured by PLA-BOR Research Laboratory of Plastics Technology Co., Ltd.), polyamide 12 as a layer (B) and the fluororesin B as a layer (A) were fed to two extruders, respectively, to mold a two-component two-layer multilayer tube having an outer diameter of 8 mm and an inner diameter of 6 mm, according to the extrusion conditions shown in Table 2. The multilayer tube has a layer arrangement of the layer (A)/layer (B), and the layer (A) is the innermost layer. The evaluation results are shown in Table 2.

Example 7

Using a two-component two-layer tube extrusion apparatus equipped with a multimanifold (manufactured by PLA-BOR Research Laboratory of Plastics Technology Co., Ltd.), polyamide 12 as a layer (B) and the fluororesin C as a layer (A) were fed to two extruders, respectively, to mold a two-component two-layer multilayer tube having an outer diameter of 8 mm and an inner diameter of 6 mm, according to the extrusion conditions shown in Table 2. The multilayer tube has a layer arrangement of the layer (A)/layer (B), and the layer (A) is the innermost layer. The evaluation results are shown in Table 2.

[Table 2]

TABLE 2

| | | Example 4 | Example 5 | Example 6 | Example 7 |
|---|---|---|---|---|---|
| Layer (A) | Cylinder temperature (° C.) | 280-280 | 280-280 | 230-300 | 260-280 |
| | Adapter temperature (° C.) | 280 | 280 | 300 | 280 |
| Layer (B) | Cylinder temperature (° C.) | 230-260 | 210-245 | 210-245 | 310-280 |
| | Adapter temperature (° C.) | 260 | 245 | 245 | 260 |
| Layer (C) | Cylinder temperature (° C.) | 200-220 | | | |
| | Adapter temperature (° C.) | 220 | | | |
| Layer (D) | Cylinder temperature (° C.) | 230-260 | | | |
| | Adapter temperature (° C.) | 260 | | | |
| Layer (E) | Cylinder temperature (° C.) | 210-250 | | | |
| | Adapter temperature (° C.) | 250 | | | |
| Die temperature (° C.) | | 280 | 230 | 230 | 280 |
| Line speed (m/min) | | 30 | 30 | 20 | 30 |
| Thickness μm | Layer (A) | 100 | 250 | 250 | 250 |
| | Layer (B) | 350 | 750 | 750 | 750 |
| | Layer (C) | 150 | | | |
| | Layer (D) | 100 | | | |
| | Layer (E) | 300 | | | |
| Adhesive strength | | 51 | 49 | 45 | 48 |
| Surface roughness Ra (μm) | | 0.12 | 0.03 | 0.03 | 0.03 |

What is claimed is:

1. A laminate comprising a fluororesin layer consisting of a fluororesin and a non-fluororesin layer containing a non-fluororesin, the fluororesin having a tensile strength retention ratio of 50% or more, the tensile strength retention ratio being calculated by the following formula from a tensile strength of the fluororesin after a heat treatment obtained by conducting a heat treatment at 130° C. for 40,000 hours, and a tensile strength of the fluororesin before the heat treatment:

Tensile strength retention ratio (%)=(tensile strength of fluororesin after heat treatment (MPa))/(tensile strength of fluororesin before heat treatment (MPa))×100, wherein the laminate comprises a polyamide resin layer consisting of a polyamide resin and an ethylene/vinyl alcohol copolymer (EVOH) layer containing an EVOH resin as the non-fluororesin layer, and the fluororesin layer and the polyamide resin layer are directly adhered with each other and the polyamide resin layer and the EVOH layer are directly adhered with each other.

2. The laminate according to claim 1, wherein the fluororesin is a melt-fabricable fluororesin.

3. The laminate according to claim 1, wherein the fluororesin has at least one selected from the group consisting of a carbonate group and a carboxylic halide group, and a total number of carbonate groups and carboxylic halide groups is 3 to 800 per $10^6$ main-chain carbon atoms.

4. The laminate according to claim 1, wherein the fluororesin contains ethylene unit and tetrafluoroethylene unit.

5. The laminate according to claim 4, wherein the fluororesin further contains hexafluoropropylene unit.

6. The laminate according to claim 1, wherein the fluororesin contains chlorotrifluoroethylene unit and tetrafluoroethylene unit.

7. A laminate comprising a fluororesin layer consisting of a fluororesin and a non-fluororesin layer containing a non-fluororesin, the fluororesin having an extraction of an extract to be extracted in perfluorocyclobutane of 0.3% by mass or less, upon immersion of the fluororesin in perfluorocyclobutane at 60° C. for 10 days, based on a mass of the fluororesin immersed, wherein the laminate comprises a polyamide resin layer consisting of a polyamide resin and an ethylene/vinyl alcohol copolymer (EVOH) layer containing an EVOH resin as the non-fluororesin layer, and the fluororesin layer and the polyamide resin layer are directly adhered with each other and the polyamide resin layer and the EVOH layer are directly adhered with each other.

8. The laminate according to claim 7, wherein the fluororesin is a melt-fabricable fluororesin.

9. The laminate according to claim 7, wherein the fluororesin has at least one selected from the group consisting of a carbonate group and a carboxylic halide group, and a total number of carbonate groups and carboxylic halide groups is 3 to 800 per $10^6$ main-chain carbon atoms.

10. The laminate according to claim 7, wherein the fluororesin contains ethylene unit and tetrafluoroethylene unit.

11. The laminate according to claim 10, wherein the fluororesin further contains hexafluoropropylene unit.

12. The laminate according to claim 7, wherein the fluororesin contains chlorotrifluoroethylene unit and tetrafluoroethylene unit.

* * * * *